(12) United States Patent
Downs, II

(10) Patent No.: US 7,769,665 B2
(45) Date of Patent: Aug. 3, 2010

(54) DATA TRANSFORMATION AND DISPLAY SOFTWARE

(76) Inventor: Haskell E. Downs, II, 2448 Rick Whinery, Austin, TX (US) 78728

( * ) Notice: Subject to any disclaimer, the term of this patent is extended or adjusted under 35 U.S.C. 154(b) by 1343 days.

(21) Appl. No.: 10/455,057

(22) Filed: Jun. 5, 2003

(65) Prior Publication Data

US 2004/0111357 A1  Jun. 10, 2004

Related U.S. Application Data

(60) Provisional application No. 60/405,215, filed on Aug. 22, 2002.

(51) Int. Cl.
*G06F 17/60* (2006.01)
(52) U.S. Cl. .................... 705/37; 705/35; 726/12
(58) Field of Classification Search ............. 705/1–60; 707/37; 185/36
See application file for complete search history.

(56) References Cited

U.S. PATENT DOCUMENTS 6,408,282 B1 * 6/2002 Buist .................. 705/36 R
6,460,036 B1 * 10/2002 Herz ..................... 707/10

OTHER PUBLICATIONS

CAIDA Perl development team, Chart::Graph::Xrt3d, Dec. 14, 2001, http://web.archive.org/web/20011214074750/http://www.caida.org/tools/utilities/graphing/graph_xrt3d.xml, pp. 1-8.*

C. Plaisant et al., Using Visualization tools to gain insight into your data, Oct. 8, 2003, web edition, pp. 1-9.*

\* cited by examiner

*Primary Examiner*—James Trammell
*Assistant Examiner*—Marissa Liu
(74) *Attorney, Agent, or Firm*—Jacqueline E. Hartt; Lowndes, Drosdick, Doster, Kantor & Reed, P.A.

(57) ABSTRACT

A multi-dimensional display of data related to market movement displays relative market movement, trend, and potential changes in trend for stocks futures, or options. The inventive system and method includes a unique graphical display of market information using static and dynamic elements of a multi-dimensional view. A Cylinder is provided as one potential geometrical shape or element for representing a single security (stock, futures or options contract). A Plate represents a reduced profile object (typically a thin plate) which contains sets or groups of Cylinders. A Map represents the surface on which Plates rest. A World represents a collection of all Maps. Measurements calculate data representative of market movement and changes in market movement and are displayed to the system user as variations in the geometry and color of the individual geometric elements. The system and method of the invention allows the user to visually observe changes in security and market performance by merely viewing changes in the shape and color of geometric elements rather than seeking to extract security and market information from conventional two dimensional graphic displays. The Clock Display summarizes movement across an entire Map. The Sky is the area above the Map.

23 Claims, 12 Drawing Sheets

*FIG. 5d*

| Sym | Below | Above | B | W | R |
|-----|-------|-------|---|---|---|
| IBM | ▭ | | ☐ | ☐ | ☐ |
| ABC | ▭ | | ☐ | ☐ | ☐ |
| GE | ▭ | | ☐ | ☐ | ☐ |
| GD | ▭ | | ☐ | ☐ | ☐ |
| TXN | ▫ | | ☐ | ☐ | ☐ |
| AAPL | | ▭ | ☐ | ☐ | ☐ |
| F | | ▭ | ☐ | ☐ | ☐ |
| MOT | | ▭ | ☐ | ☐ | ☐ |
| AMD | | ▭ | ☐ | ☐ | ☐ |

Flat View

Literal View

Semi Circle

Semi Circle w/ Trailing Image

Linear

Directed Linear

Guage

Thermometer

Fig 8a – Screen capture of working prototype created by the inventor.

DATA TRANSFORMATION AND DISPLAY SOFTWARE

CROSS REFERENCE TO RELATED APPLICATION

This application claims the benefit of prior filed U.S. Provisional Application Ser. No. 60/405,215, filed Aug. 22, 2002, entitled "MULTI-DIMENSIONAL DISPLAY OF DATA RELATED TO MARKET MOVEMENT" by Haskell E. Downs II.

BACKGROUND OF THE INVENTION

1. Field of the Invention

The present invention relates generally to market visualization displays and more specifically it relates to a multi-dimensional display of data related to market movement for displaying relative market movement, trend, and potential changes in trend for any security including stocks, futures, or options.

2. Description of the Prior Art

Market visualization displays have been in use for years. Typically, market visualization displays are comprised of simple displays similar to the Map of the Market web page, found at http://www.smartmoney.com.

The main problem with conventional market visualization displays is that they do not show as much relevant market information as is possible to display in a two dimensional or three dimensional picture. Another problem with conventional market visualization displays is that they do not calculate and display abstract concepts that are related to, and indicative of market movement, such as velocity of price, acceleration of price, or similar leading or predictive indicators of future market activity. Another problem with conventional market visualization is that they do not show the relationship between market components. It is up to the user to deduce how individual components (stocks, futures, or options) affect and relate to each other in a fast-moving market environment.

While these prior art systems may be suitable for the particular purpose to which they address, they are not as suitable for displaying relative market movement, trend, and potential changes in trend for stocks futures, or options. They do not show as much relevant market information as is possible to display in a two dimensional or three dimensional picture. Similarly, they do not calculate and display abstract concepts related to, and indicative of market movement, such as velocity of price, acceleration of price, or similar leading or predictive indicators of future market activity nor can they show the relationship between components. It is up to the user to deduce how individual components (stocks, futures, or options) affect and relate to each other in a fast-moving market environment.

In these respects, the multi-dimensional display of data related to market movement according to the present invention substantially departs from the conventional concepts and designs of the prior art, and in so doing provides an apparatus primarily developed for the purpose of displaying relative market movement, trend, and potential changes in trend for stocks futures, or options.

SUMMARY OF THE INVENTION

In view of the foregoing disadvantages inherent in the types of market visualization displays now present in the prior art, the present invention provides a new multi-dimensional display of data related to market movement for displaying relative market movement, trend, and potential changes in trend for stocks futures, or options.

The general purpose of the present invention, which will be described subsequently in greater detail, is to provide a new multi-dimensional display of data related to market movement that has many of the advantages of the market visualization displays mentioned heretofore and many novel features that result in a new multi-dimensional display of data related to market movement which is not anticipated, rendered obvious, suggested, or even implied by any of the prior art market visualization displays, either alone or in any combination.

To attain this result, the present invention generally comprises a unique graphical display of market information using static and dynamic elements of a multi-dimensional view. A Cylinder provides a geometric shape representing a single security (stock, futures or options contract). A Plate is defined as a reduced profile object (typically a thin plate) which contains a set or group of Cylinders. A Map is defined as the surface on which Plates rest. A World is defined as the collection of all Maps. Measurements represent processed security price or price plus volume data for indicating market movement and changes in market movement. A Clock Display summarizes movement taking place across an entire Map. The Sky is defined as the area above the Map.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the specific details of construction and to the specific arrangements of the components set forth in the following description or illustrated in the drawings. The invention is capable of other embodiments and of may be practiced and carried out in various ways. The phraseology and terminology employed herein are for the purpose of the description and should not be regarded as limiting.

A primary object of the present invention is to provide a multi-dimensional display of data related to market movement that will overcome the shortcomings of the prior art.

An object of the present invention is to provide a multi-dimensional display of data related to market movement for displaying relative market movement, trend, and potential changes in trend for stocks futures, or options.

Another object is to provide a multi-dimensional display of data related to market movement that calculates and displays derivatives of market movement, such as velocity of price, acceleration of price and/or volume, and other dynamic measurements.

Another object is to provide a multi-dimensional display of data related to market movement that calculates these derivatives of market movement for individual market components and groups of market components.

Another object is to provide a multi-dimensional display of data related to market movement that indicates probable direction of movement for individual stocks, futures or options, based on measured derivatives of market movement.

Another object is to provide a multi-dimensional display of data related to market movement that displays events which show direction of movement.

Another object is to provide a multi-dimensional display of data related to market movement that maximizes use of the 3-dimensional space to display this information.

Another object is to provide a multi-dimensional display of data related to market movement that allows the user to see a composite picture of this information by viewing a single display.

Another object is to provide a multi-dimensional display of data related to market movement that provides visual and audible cues when the information changes, showing the extent of change.

Other objects and advantages of the present invention will become obvious to the reader and it is intended that these objects and advantages are within the scope of the present invention.

To accomplish these and related objects, this invention may be embodied in the form illustrated in the accompanying drawings, attention being called to the fact, that the drawings are illustrative only, and that extensive changes may be made in the specific construction illustrated without departing from the scope of my invention

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 5d represents a block diagram illustrating map data configured in a sortable, two dimensional "list" format.

FIG. 8a represents a screen capture of a three-dimensional prototype of the present invention.

FIG. 8b represents a transparent chart rendered in front of the Map illustrated in FIG. 8a.

DESCRIPTION OF THE PREFERRED EMBODIMENT

Figure 1:
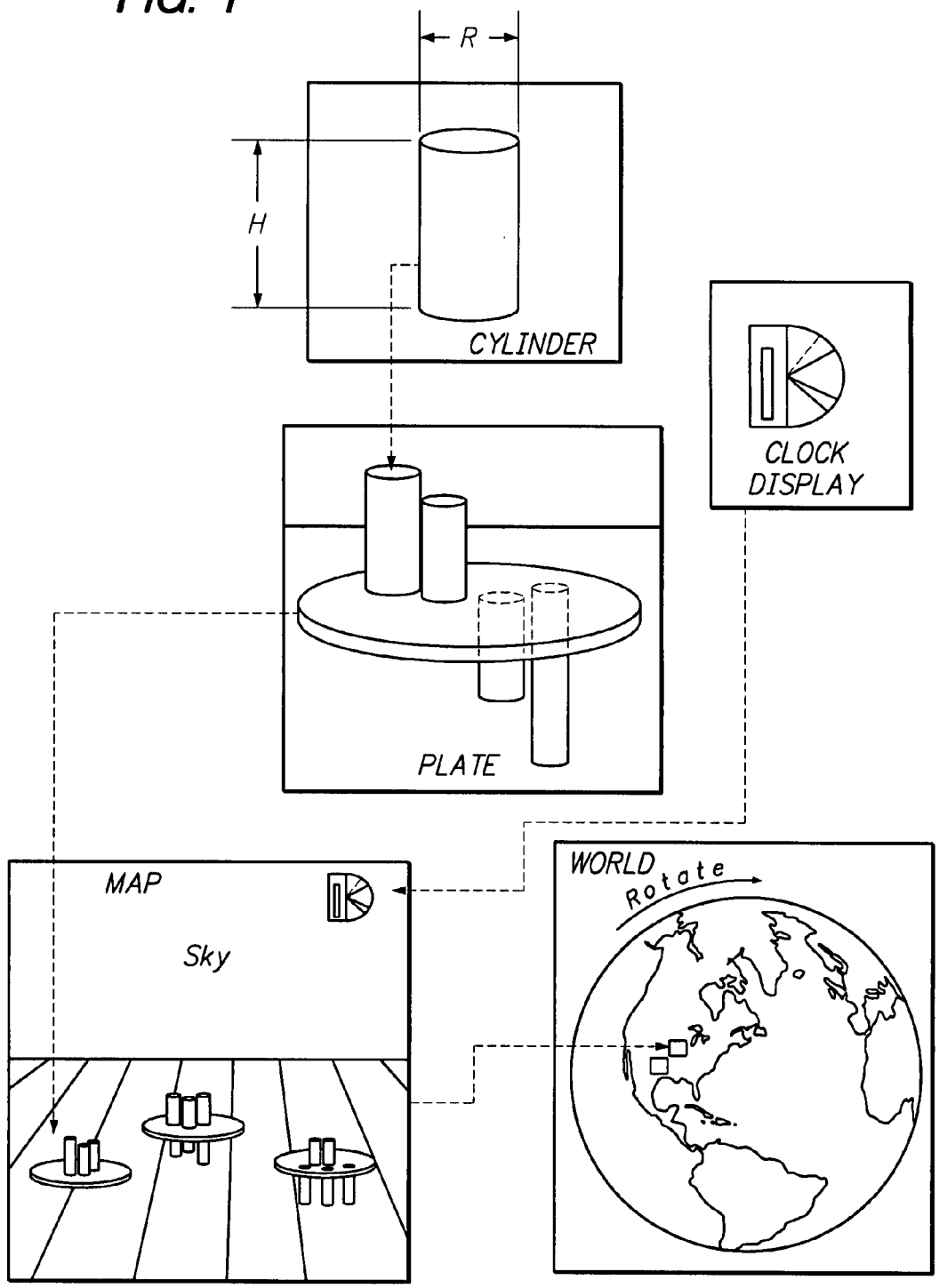
FIG. 1 illustrates an exploded view of the display methodology of the present invention.

The drawings, in which similar reference characters denote similar elements throughout the several views, illustrate a multi-dimensional display of data related to market movement, which comprises a unique graphical display of the market information using static and dynamic elements of a multi-dimensional view. As illustrated in FIG. 1, a Cylinder is prerecorded as a geometrical shape or element for displaying data representative of a single security (stock, futures or options contract). A Plate is a reduced profile object (typically a thin plate) which contains a set or group of Cylinders. A Map represents the surface on which Plates rest. A World represents a collection of all Maps. Measurements represent market movement and changes in market movement. A Clock Display summarizes movement across an entire Map. The Sky is the area above the Map.

Figure 3:
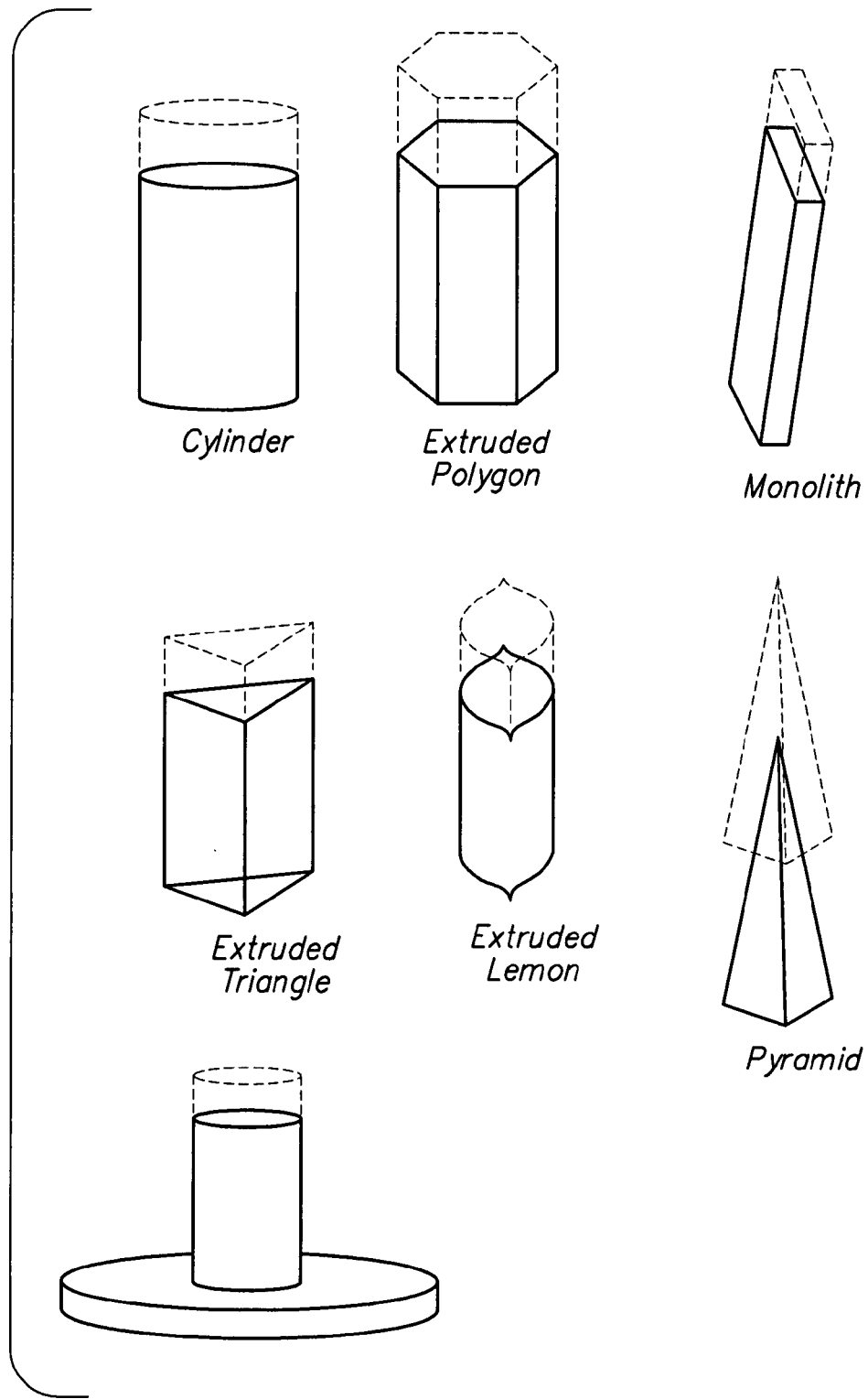
FIG. 3 illustrates geometric variations and variations on the theme of a Cylinder, where the dotted line above each alternative shape constitutes a "trailing image" which can also be used to represent a measurement.

A Cylinder is a geometric shape or element representing a single security (stock, futures or options contract). A Cylinder may be implemented with a cylindrical shape, but as illustrated in FIG. 3 may be implemented as other shapes. Each surface of the Cylinder may be used to display relevant market measurements. Each Cylinder may also include a trailing image which rests above or below the solid Cylinder shape. The trailing image may be transparent or a depicted in a different color, and represents an additional state of the object (typically, values from a prior timeframe). Multiple measurements can be rendered and displayed by translating such measurements to the dimensions of height and width of the Cylinder, as well as color on each surface, including the trailing image, plus the transparency feature of the trailing image. Other shapes besides cylinders can be used, such as cylindrical hexagons, octagons, etc. Each face of the geometric object may have different renderings to visually depict a different aspect of market movement. In addition, each face of the geometric object may flash at various rates based on the value of the measurement, and symbols (such as arrows, pyramids, spheres, or alphanumeric characters) may be displayed above, below, on top of, or within the geometric object to represent and visually depict other events or states. The texture of the object surfaces may also be varied according to the value(s) of one or more Measurements, as can the configuration, thickness or texture of border lines around the image (the collar at the base of a Cylinder, for example). A key element of the invention represents the use of Measurements to directly represent and visually depict various aspects of market movement by applying them to physical attributes (e.g., size, shape, color) of each Cylinder or geometric element.

Figure 4:
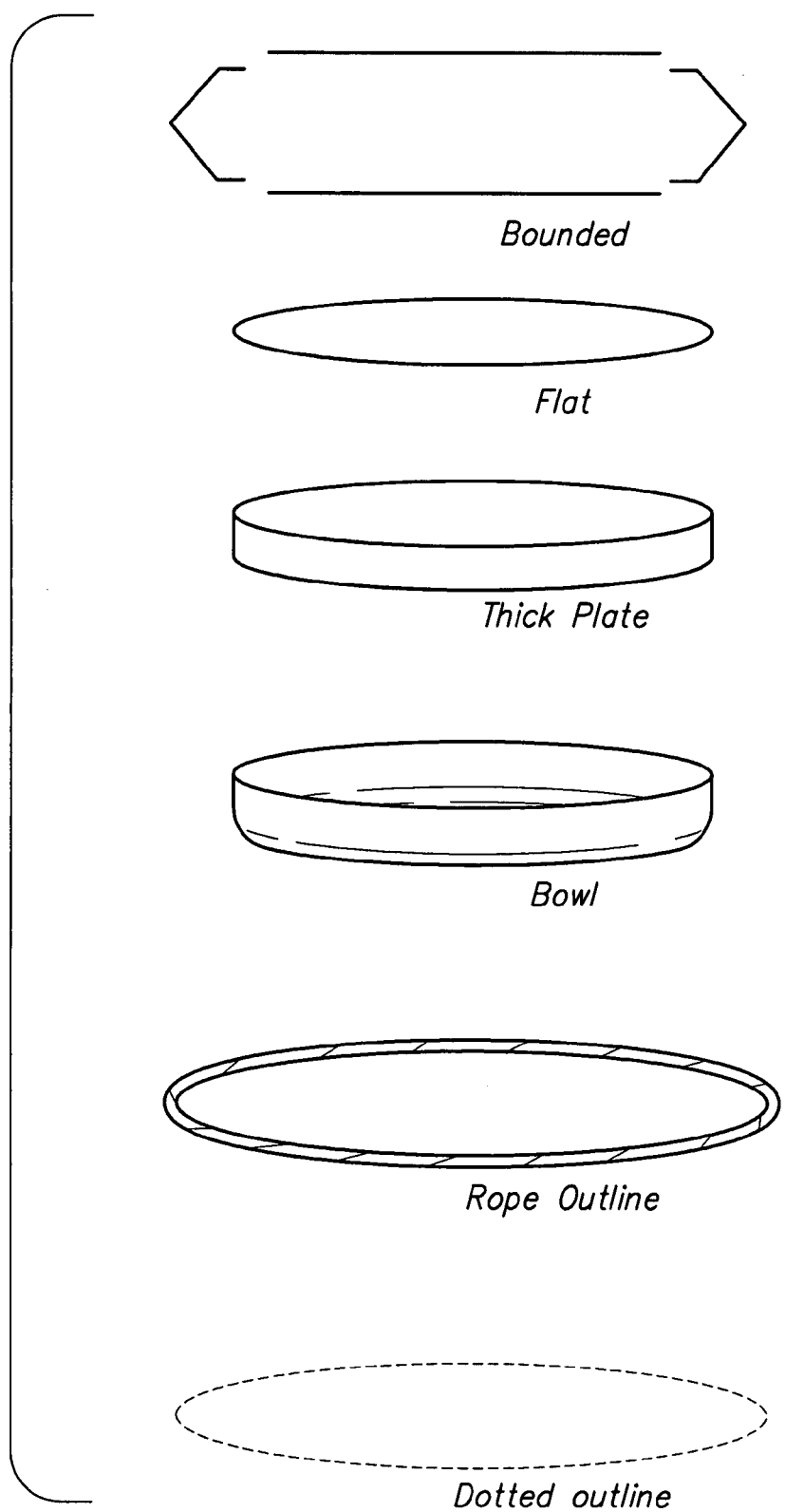
FIG. 4 illustrate variations on the theme of a Plate.

A Plate represents a reduced profile object (typically a thin plate) which contains sets or groups of Cylinders. The physical attributes of each Plate (that is, the surfaces of the Plate) are rendered and depicted so that each Plate reflects movement of the set or group of cylinders which rest on it. A Plate is the bounding surface on which one or more Cylinders rest. A Plate is used to assist in visually displaying the composite action of all Cylinders on a given plate, and is typically capable of visually depicting the market behavior of a related group of securities in real time. As illustrated in FIG. 4, a Plate can be round or any other shape for accommodating a group of Cylinders. A Plate may have thickness, or may be depicted with a zero thickness. A plate may have its own color, assigned to any of the multitude of attributes available to groups of Cylinders. A Plate may have a texture, and may have the capability of displaying information by flashing any selected Plate surface. A textual label may be imprinted on the Plate to name the group of Cylinders depicted on the Plate.

Figure 2:
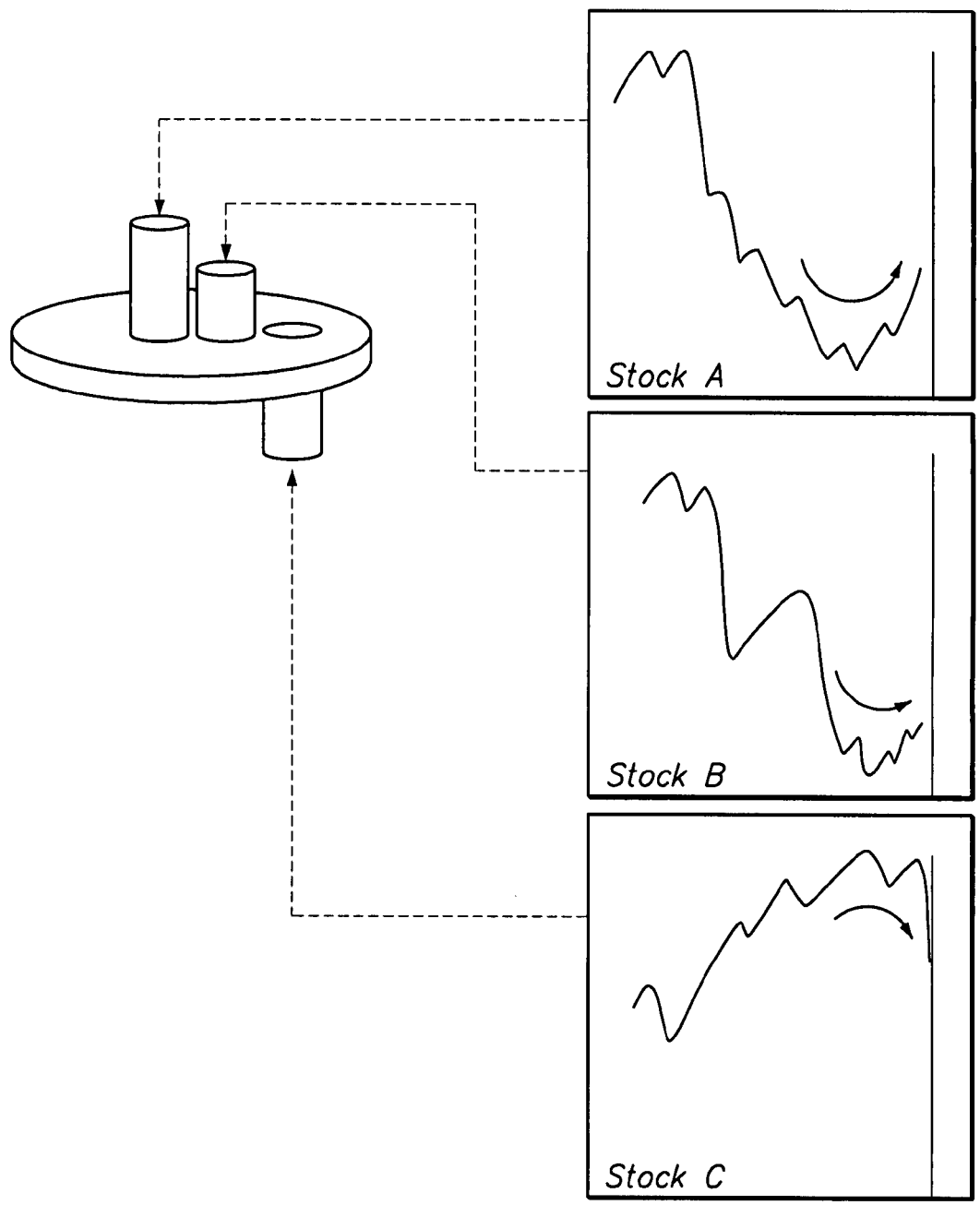
FIG. 2 illustrates a representative view of Cylinders and Plates, showing sample Measurements where the plate and cylinders correspond to Stocks A, B and C.
Figure 5A:
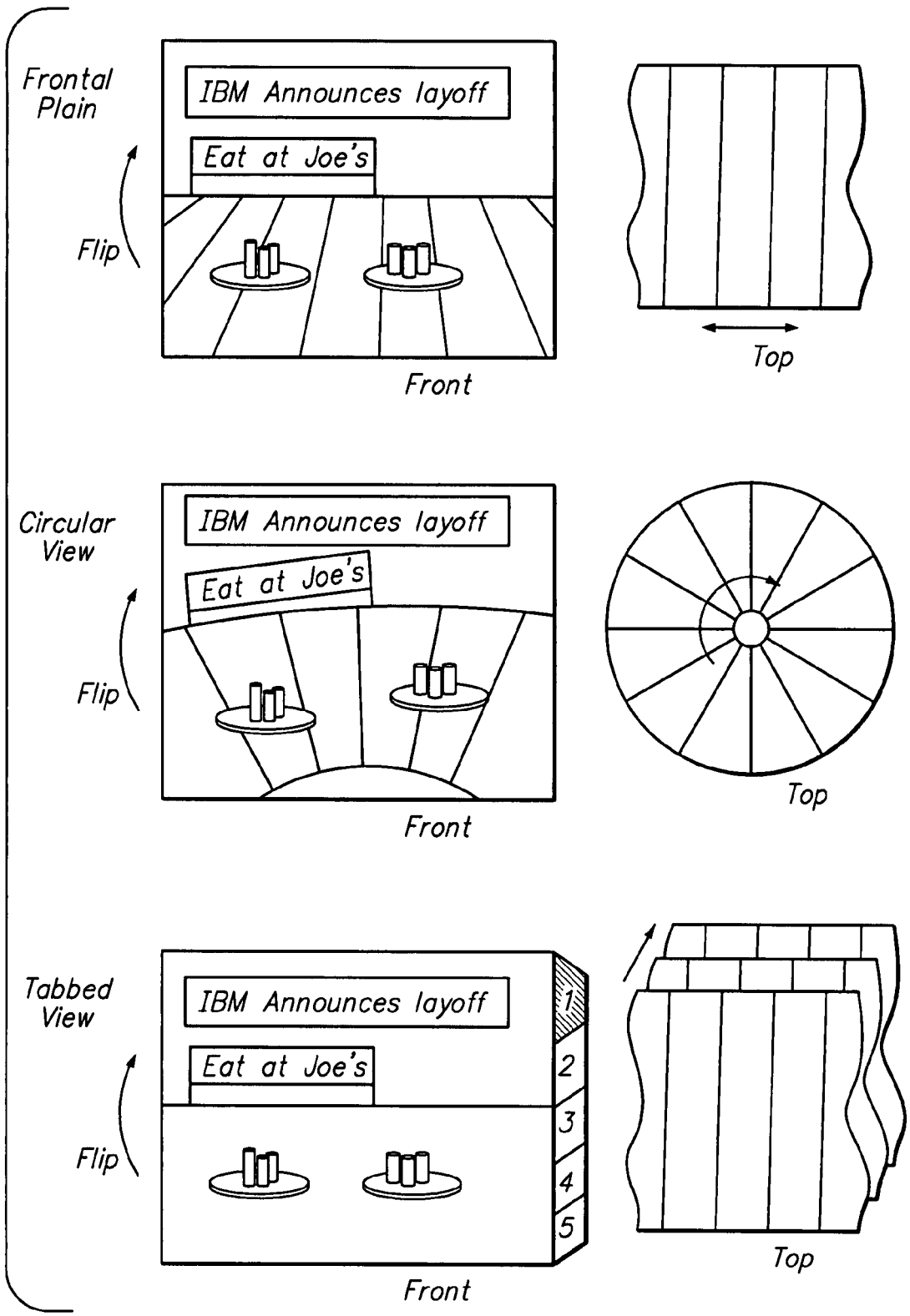
FIG. 5a illustrates variations on the theme of a Map, including a frontal plain view, a circular view and a tabbed view.

As shown in FIG. 5a, a Map is the surface on which a set of Plates rest. The Map defines a specific collection of all Plates and Cylinders. The surface of a map represents a plane having a Measurement value of zero. As shown in FIG. 2, values greater than zero are depicted as cylindrical objects extending above the map plane by an appropriately scaled amount. Values less than zero are displayed as cylindrical objects extending below the map by an appropriately scaled amount. As shown in FIG. 5a, a Map may further be subdivided into market sectors, where each sector defined as a collection of Plates. The ground (visible surface) or plane of the Map may be delineated with boundaries to indicate collections of Plates defining discrete sectors. Each bounded area represent one Sector may also be depicted as colored or textured, or may flash to represent movement of Plates which belong to the Group. The concept of a "Map" extends to any and all visual depiction of any Measurement. The Map may be depicted as a flat plane, or it may be rendered as a curved surface which can then be rotated by the user, to allow the user visualize all Plates and Cylinders on the Map within a more complete but not fully displayed circular view. The Map can be rendered in a two-dimensional plane, in list format, or in other views, as shown in FIGS. 5a-d.

Figure 6:
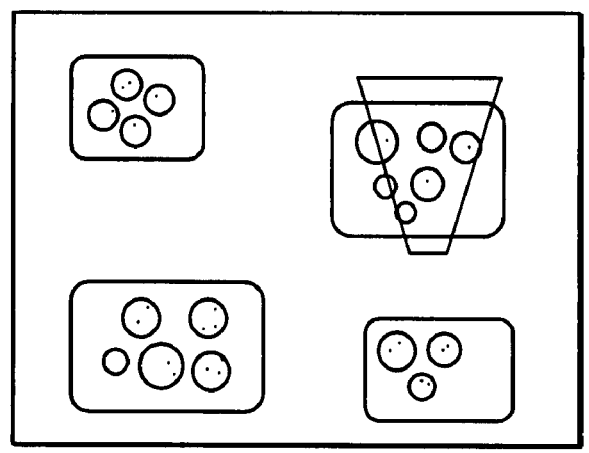
FIG. 6 represents variations on the theme of a World, specifically illustrating a flat view and a literal view.
Figure 6:

The World represents a the collection of all Maps. The World typically represents an entire market or a large subset thereof. That is, the concept of "world" is extended as a natural hierarchy of Maps comprising the World. A World view is not a required component of an embodiment of the invention, but represents a logical extension of the hierarchical concepts already defined to extend to a collection of Maps. The World may be depicted as various physical metaphors, including torroids, spheres, or flat, tabbed views. Multiple markets may be shown using a spherical surface ("globe") with discrete Maps populating the globe. A Universe of Worlds (i.e., multiple spheres or globes) may also be used to denote collections of markets. Any display method which shows the hierarchical organization defined herein, based on the Measurements, falls within the definition of a World. A few potential variations are illustrated in FIG. 6.

As illustrated in FIG. 2, Measurements represent and evaluate market movement and changes in market movement. Measurements may take the form of formulas based on price and volume action on individual stocks, futures or options or grouping of stocks, futures or options. Individual Measurements contribute to the invention by providing dynamic information which assists a user to better evaluate what a market is doing, and also implies or suggests the course of future market behavior. Previously available three dimensional views of the market typically depicted only changes in price for a specified market session. Other types of Measurements are far more sophisticated and informative than simple unprocessed price change data and are truly more useful and helpful to traders and investors because such processed data more readily shows changes in the state of the market.

Examples of such processed data measurements represent current trend, change in trend, velocity of price, acceleration of price, volatility, and other measurements designed to show the current state of the market and the tendency toward a new state (for example, from trending down to trending up). Such processed data may also incorporate volume information as well as processed price and/or volume information for groups of securities or entire market or market sectors. A large and infinite class of measurements may be derived to show current state and change in state of the market.

The term "Measurement" is intended to encompass all processed data output signals as generally described above which may be applied to and displayed as changes or variations in the physical characteristics of Cylinders, Plates, or Maps. The number of potential Measurements is infinite, and includes all existing formulae based on price, volume, and time (as well as subsequently developed or modified formula) individual stocks futures or options or to composite charts based on logical groupings of stocks futures or options.

Figure 7:
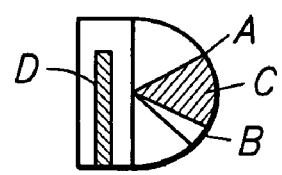
FIG. 7 illustrates various embodiments of the Clock Display, specifically illustrating various market state values based on a summary of map measurements.
Figure 7:
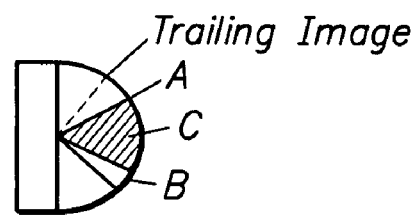
Figure 7:
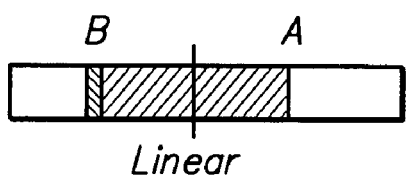
Figure 7:
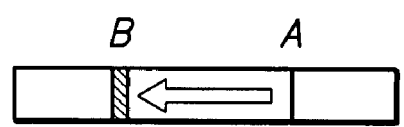
Figure 7:
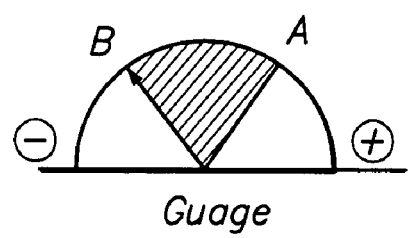
Figure 7:
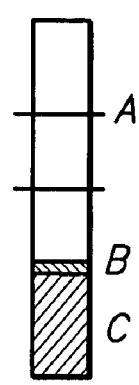
Figure 8B:
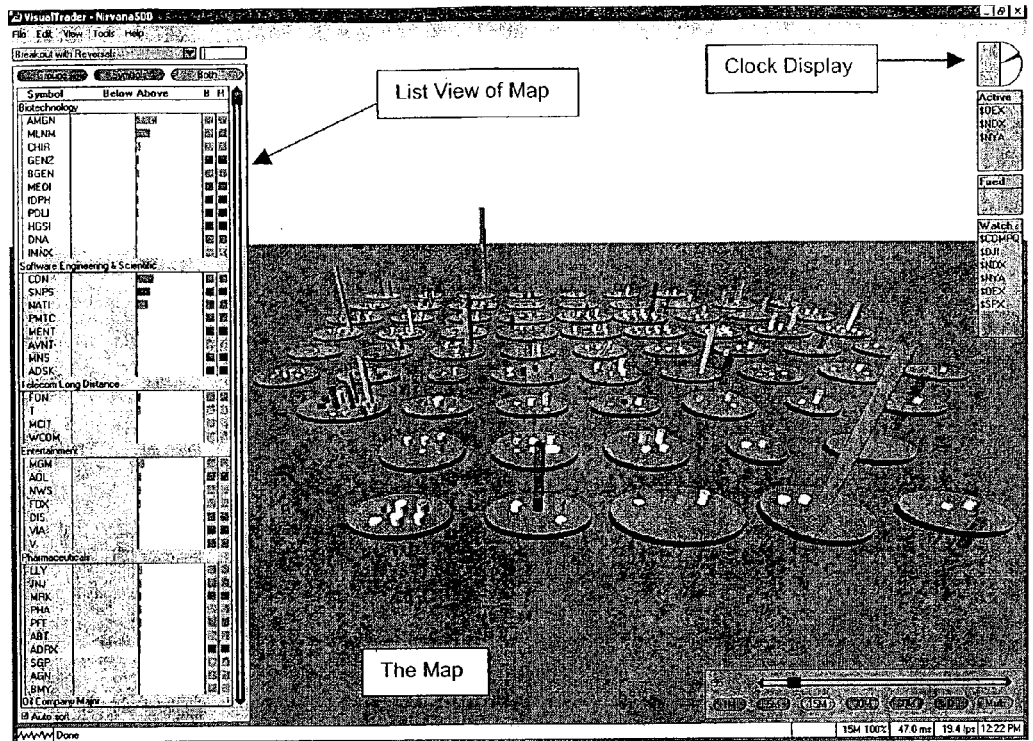
Figure 8B:
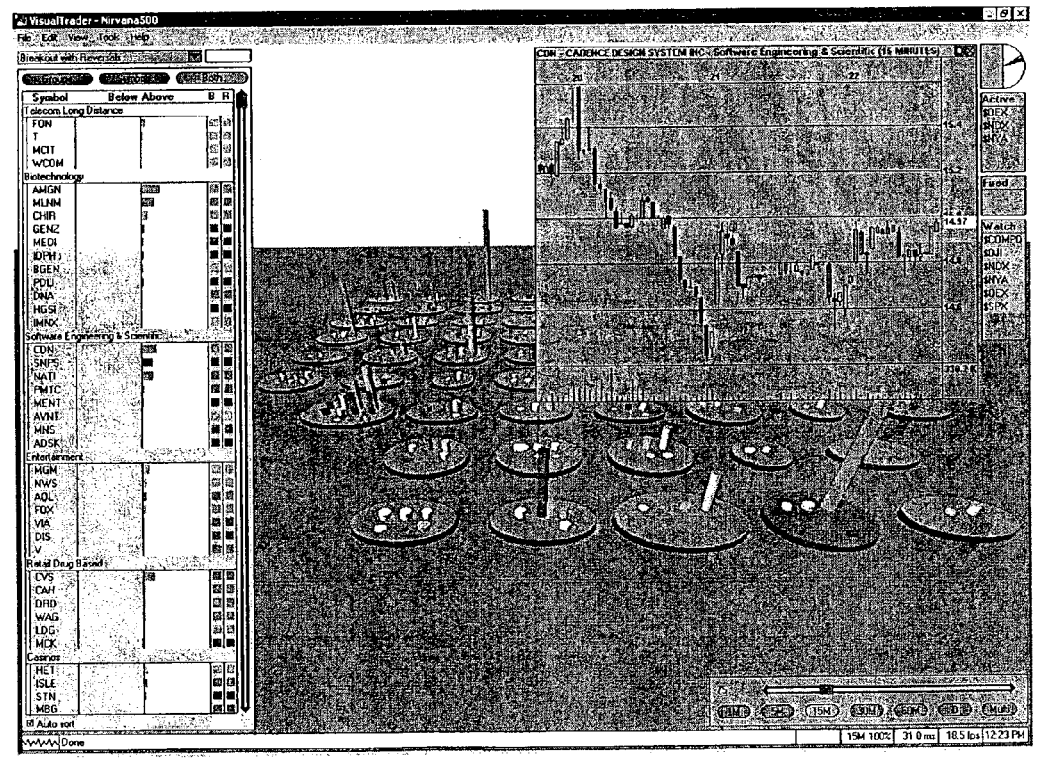
Figure 8C:
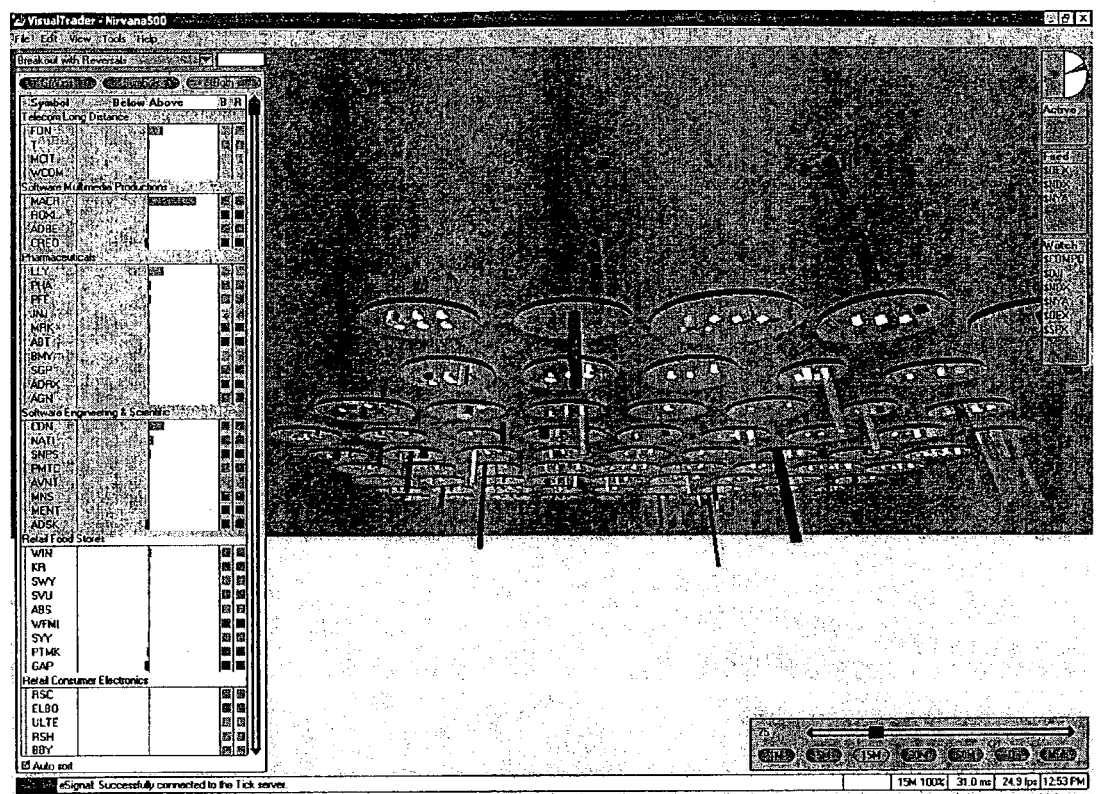
FIG. 8c illustrates a view of the Map of FIG. 8a, rotated to show the negative value Cylinders located below the Zero Plane.

The Clock Display illustrated in FIGS. 7 and 8 summarizes security movement across an entire Map. The Clock Display is designed to show a composite view of the current state of the depicted market segment as well as movement taking place within a Map. Two or more clock "hands" may be provided to display selected measurements, plus an additional, separate vertical zone may be provided in the clock display (see FIG. 7) to display additional market information. The vertical zone may be replaced by a separate clock face.

Typically, one hand on the Clock will indicate current trend of the securities displayed within the Map and another hand will display an indication of change in trend, with coloration between the hands indicating strength of movement. However, any selected physical Measurement may be assigned to any hand or surface of the Clock. Multiple Clocks may be deployed to display data relating to multiple Maps. A user may click on any Clock to bring the related Map into view.

Other variations of a Clock Display may be provided, including linear gauges (such as a thermometer style gauge), horizontal semi-circles (such as voltmeter style meter display) and as well as other display orientations. Any physical embodiment of a gauge or dial display capable of visually depicting information from a Map is classified as a "Clock" for the purpose of this disclosure.

Figure 5B:
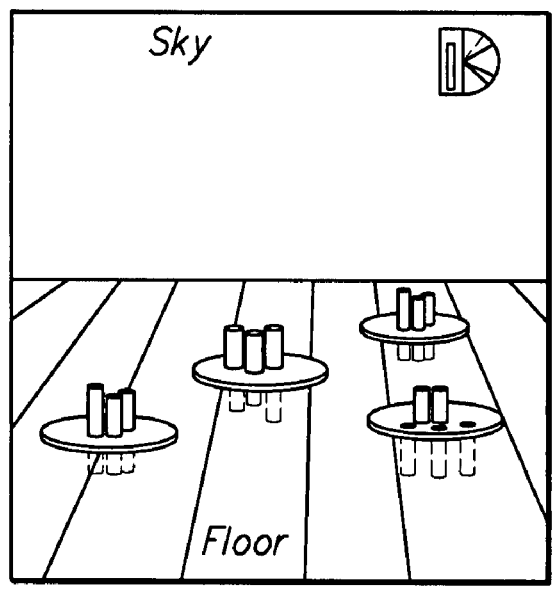
FIG. 5b illustrates a representative view of a map rendered in three dimensions.

As illustrated in FIGS. 5a and 5b, the Sky represents the area above the Map. The Sky is used to display visual information which may serve as cues to the Map. Any information may be displayed to assist the trader or investor isolate security group or market movement or the potential for movement. Examples of potential information display application for the Sky display feature include displaying breaking news headlines, tables of price information, or other lists. The Sky can also be used to display commercial information, such as billboards, banners or other "pop-up" advertising media which may be sold to other firms. In this way, the World poses the appearance of a true three-dimensional world displaying information above, below, and on the depicted Maps.

Figure 5C:
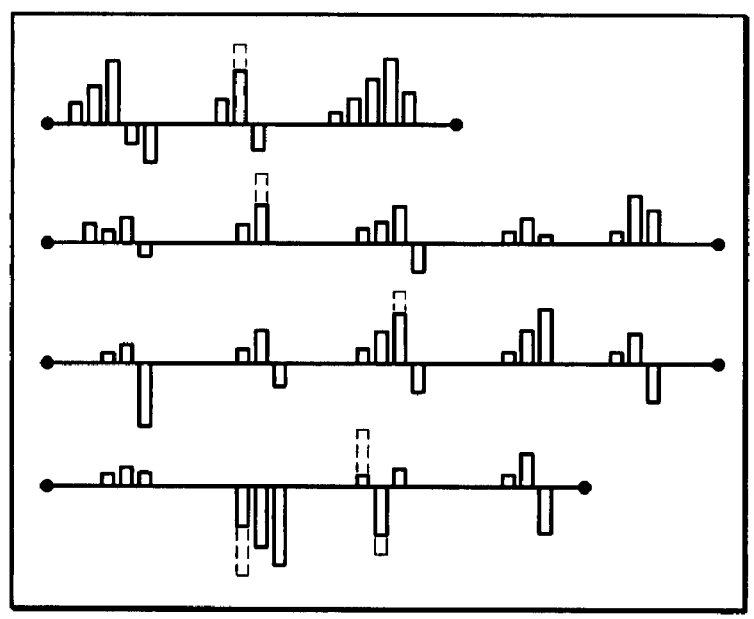
FIG. 5c illustrates a representative view of a map rendered in two dimensions.
Figure 5D:
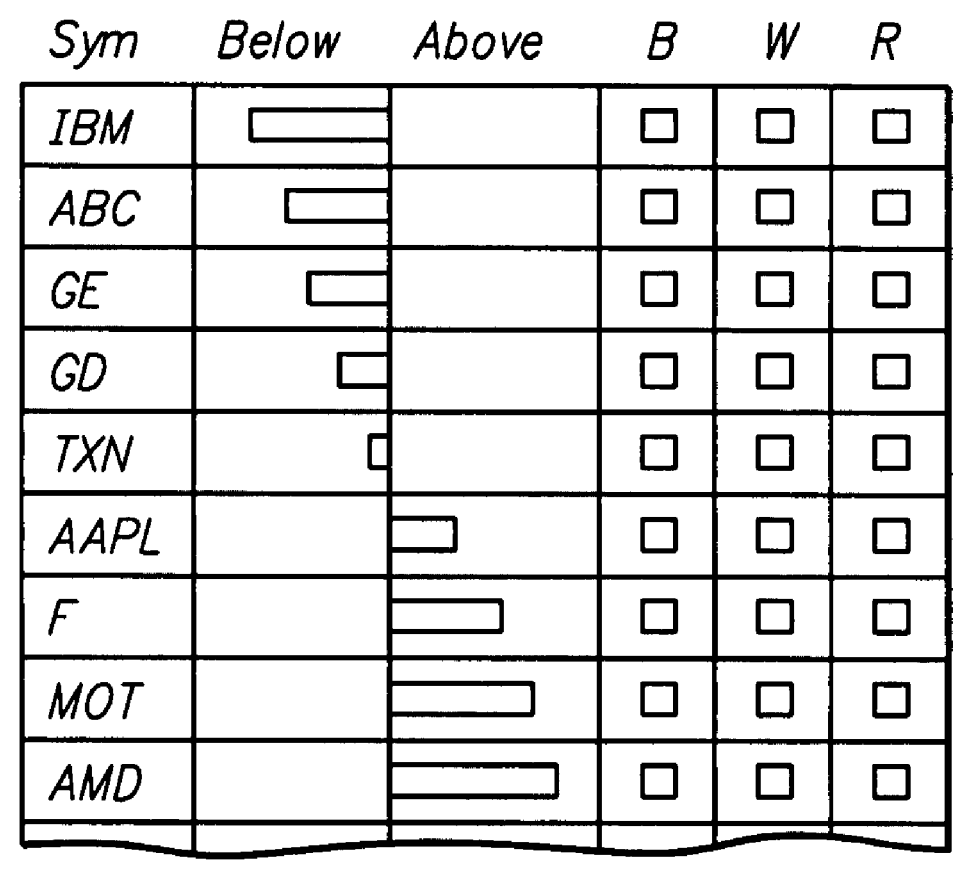

As shown in FIG. 8a, Cylinders rest on or within Plates boundaries and Plates rest on or within Map boundaries. On the surface of a Map, a zone may be provided to designate selected groups of Plates (sometimes also referred to as Sectors). Multiple Maps may be grouped as well, on a planar or cylindrical surface. In a two-dimensional view as shown in FIG. 5c, sets of cylinders appear as flat objects on a screen, with colors and surface area regions above and below the map. Such a two dimensional map is generally less useful than a full three dimensional display, but represents an alternative method for representing the same information, without the third dimension.

The invention is typically composed of up to four levels of hierarchy composed of World, Map, Plate, and Cylinder, although a viable embodiment may be achieved with only Plates and Cylinders. In the most simplified embodiment of the invention, processed data will be displayed using nothing more than a set of geometric elements such as cylinders. Cylinders represent individual securities (stocks, futures, or options). Cylinders may be grouped into Plates to represent logical groups of securities. Plates may be organized into a Map, which represents a logical grouping within the larger market, and Maps are organized on the World, which represents the entire market.

Using the invention, a trader or investor is capable of simultaneously viewing many aspects of both market movement, as well as simultaneously viewing an extensive collection of visible variations in security performance displayed as changes in geometric parameters and coloration properties of literally up to several hundred securities in real time on a single display screen.

Such security and market performance data includes, but is not limited to, velocity of price, acceleration of price, current trend, price breakouts, volatility, relative volume increases or decreases, and any other measurement designed to show the state of an individual security, a group of securities or an entire market, as well as recovery visual indications of potential changes in state.

This result is accomplished by assigning correlating specific Measurements with physical attributes of Cylinders or Plates. Physical attributes to which Measurements may be assigned include size, height and shape of a Cylinder or Plate, the color of each face of a Cylinder or Plate, and the texture or flashing attributes of each face. In addition, a positive and a negative dimension may be added since Cylinders may be displayed as extending above or below the Map, where the plane of the Map represents a zero value. All measurements are normalized or scaled so that the displayed values fluctuate within a fixed range to enable them to be displayed as a controlled variation in a physical attribute.

Cylinders represent individual tradable securities (stocks, futures, and options) while Plates represent logical groupings of tradable securities (such as industry groups, commodity groups, indexes, or market exchanges). A Map is composed of Plates, representing a logical grouping within the larger market (such as an index or an exchange). As a result of the visual display of color and geometric variations of a plurality of geometric elements confined with the organization provided by the Plate map/world system, it is easier for the user to determine when a consensus move is taking place within a market, thus providing a better trading opportunity. The user can readily observe, at a glance, the behavior, direction, and changes taking place across an entire market consisting of hundreds of securities. At the next level of hierarchy, the World is composed of Maps, enabling the user to see multiple markets in a single view. This feature enables the user to gain a global understanding of the market as a whole.

The user interacts with this information by activating (or clicking) individual Cylinders, Plates, or Maps. As shown in FIG. 8a, Clock Display shows the composite interaction of the Cylinders within a Map, conveying relative movement in a single view. Using this display, the user can tell, at a glance, whether the market represented by a selected Map is turning up or down, and the degree to which it is changing direction. If multiple Clocks are deployed, a user may navigate to other Maps (or groups) represented by the Clock by activating (e.g., clicking) the Clock.

In summary, the invention gives the user more information about the state and change in state of the market than is currently available in any prior implementation of a two- or three-dimensional view of the market.

Construction of the Invention

Figure 9:
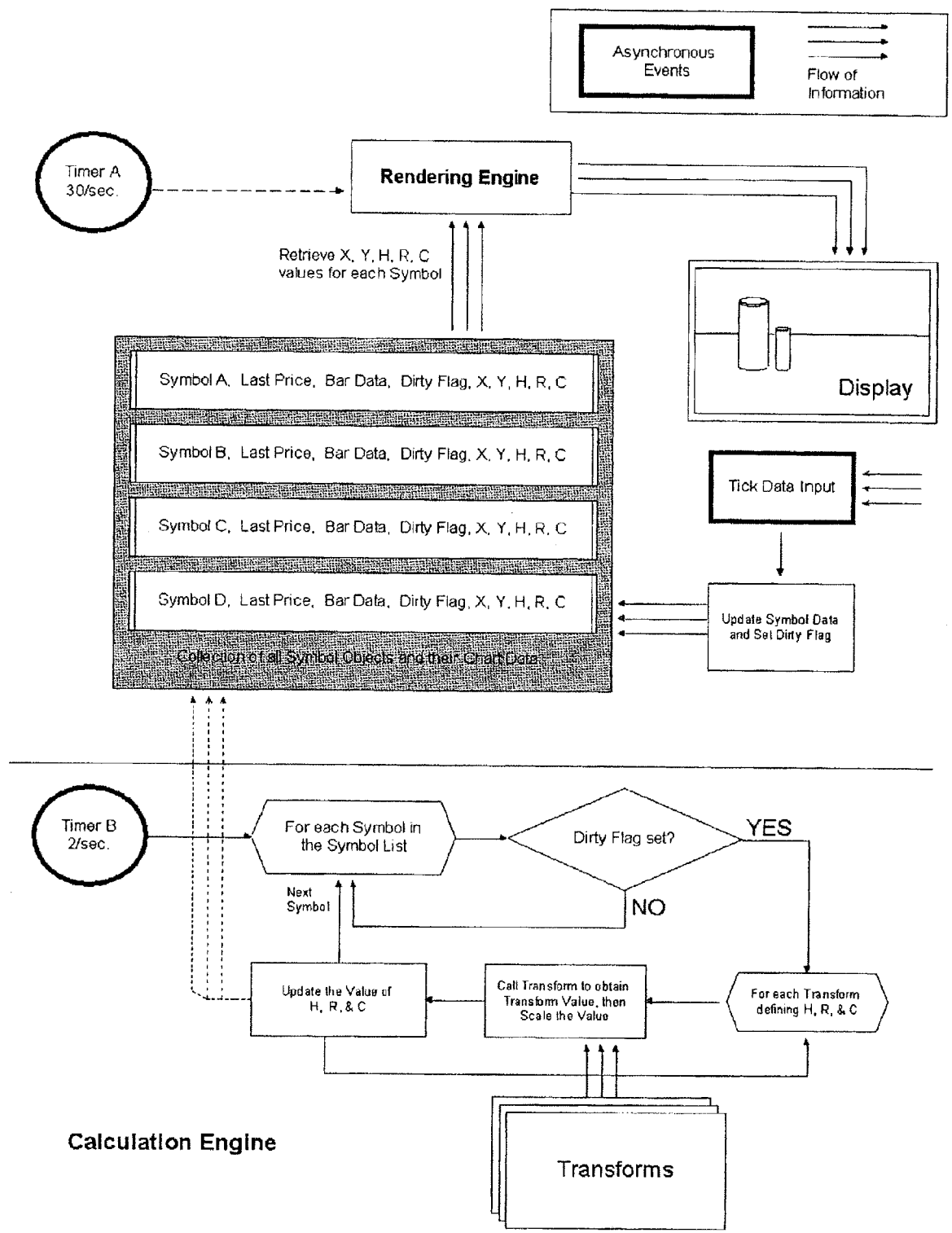
FIG. 9 represents a software flowchart illustrating the data processing methodology implemented to achieve the analysis and display goals of the present invention.

One embodiment of a program capable of implementing the features has been described above in the written description and in the related drawing FIGS. 1-8. The FIG. 9 flow chart and the additional description set forth below is directed to a programmer of ordinary skill. Within the program itself, a physical collection of program objects govern how the software operates. The objects and processes which manipulate them will now be described below.

System Components

The program employs a computer graphics system capable of displaying two and three dimensional information on a computer monitor. The prototype was implemented in the Windows 2000 operating system using an nVidia graphics accelerator card containing 64 megabytes of memory (on the card), plus Microsoft's DirectX 3-D Drivers to drive the graphics card. The DirectX 8.1 Specification is available at http://www.microsoft.com. Other implementations may be realized (e.g., Apple MacIntosh or Sun Workstation, web site using HTML or Flash or other), provided that the basic components for calculating transforms and rendering a three dimensional display are provided.

Rendering Engine

To provide the physical display constituting Map and World, a three-dimensional software rendering engine may be used. The Microsoft DirectX drivers provide a convenient implementation of such an engine, although others may be used. The rendering engine essentially takes a list of objects and renders them on the user's monitor (or monitors), as if the user were looking at the objects standing at a specific point in space (the vantage point). In the World, there is typically one object representing the floor, which is planar and extends to the horizon. The other objects—specifically the Plates and Cylinders—are modeled as Symbol objects, with physical coordinates on the floor, plus additional physical attributes which define the object; height (H), radius (R), color (C), etc.

An asynchronous timer event fires 10-30 times a second. The precise interval depends on the speed of the video card in the system (a test is made for video card speed when the program is first loaded). The event calls the rendering engine, which then accesses the collection of Symbol objects to retrieve the location (X,Y), height (H), radius (R), and color (C) attributes of each Cylinder object. Once all objects have been fed to the rendering engine, the engine renders the display according to the viewpoint perspective of the user.

The rendering engine itself is a generic component within the program (the preferred embodiment is DirectX). The manner in which the rendering engine executes hidden line and surface removal, as well as surface texturing is generally not accessible to the programmer who implements the Program. Any similar engine can be used, provided the engine properly renders a World given a complete definition of objects in the world, including textures and colors of the objects.

Viewpoint Changes

The viewpoint of the user is established through various key and mouse commands. For example, when the user clicks-and-drags the floor up, down, left or right, the viewpoint will change. It is important to note that, as the user is dragging the floor or changing viewpoint, the rendering engine is called continuously through the asynchronous timer event. This gives the effect of smooth pan and zoom on the display.

Price Data Updates

Market information is delivered to the Program by a separate Data Component. The Data Component performs the task of receiving market updates, or "ticks" for price changes on individual market instruments (stocks, futures contracts, or any other tradable item) and saves the latest value with a Symbol object. Multiple sequential "bars" of data are constructed and saved in a historical data file for access when needed (such as, to calculate a transform, as described next. These bars of data are saved for different time intervals, as specified by the user. Examples include 1 Minute, 5 Minute, 15 Minute, 30 Minute, 60 Minute, Daily, and Weekly. For example, a 5 Minute bar contains a summary of all tick information collected during each 5 minute interval. At least 300 bars in each of these timeframes is required for meaningful operation of the Program. Each new "tick" constitutes an asynchronous event, at which point the new price is saved off and information added to the current bar being constructed.

Calculation Engine

Approximately twice (2x) per second, the calculation engine is called through the use of a second, independent asynchronous event timer. The Calculation Engine's job is to adjust the geometries of the objects in the World according to changes in the data. When the timer event fires, the Calculation Engine is called, which in turn calls the Transforms which have been specified for each object in the World to update the physical attributes (height, radius, color) of each object. The attributes are in turn stored as properties of the objects and a Dirty Flag is set for updates (see FIG. 9 flowchart). The mathematical transformation between market data and physical attributes is described below.

Transforms

A separate collection of subroutines, called "transforms" is provided for the Calculation Engine to call as required. Within the user interface of the Program, the user can assign any attribute (Height, Radius, Color, etc.) of a Cylinder object to one of several transforms provided. As indicated in the abstract, the invention has been designed to display derivative information in a physical way (as opposed to price information alone). Each derivative is called a "transform". The transforms currently used in the invention are described below, but any mathematical formula which converts price information and change in price information into a discrete value within a range, can be used.

Each transform generates a value between a range of +N to −N. In the prototype, this is defined as +1.0 to −1.0 for convenience, but any range can be used. The transform information is scaled to this range so that a the entire range of values can be shown in the objects in the World. For example, assuming that 66% of the values generated by a Transform, in a given timeframe, occur below a value of 5.0, the Transform will scale values from −8.0 to +8.0 to −1.0 to +1.0, essentially scaling values to ⅛ their original number before they are mapped to the display. Values above and below +8 and −8 respectively are clipped to these values. This provides a consistent relative view of cylinder dimensionality.

In the following transform measurements, each Indicator is a classic indicator in the art of technical analysis, as defined in the following reference which is hereby incorporated by reference: Achelis, Steven B., *Technical Indicators from A to Z*, McGraw Hill, 1995.

Volatility: The volatility transform is defined as the Volatility Indicator. Essentially, volatility measures the average range of data bar high and low values, over the prior 14 bars.

Trend: Trend is defined as the value of the MACD curve. MACD stands for Moving Average Convergence/Divergence, and is calculated as the difference between a 12-period and 26-period Exponential Moving Average Indicators.

Change in Trend: Change in Trend is the first derivate of MACD, or the change in MACD from one bar to the next, i.e., dMACD/dt.

Reversal: The Reversal Transform is a Boolean value, indicating whether the slope of the MACD plot has changed from positive to negative or vice versa over the prior four bars. That is, Reversal is the second derivate of MACD, ($d^2MACD/dt^2$) and will only emit a value when the sign of dMACD/dt changes from positive to negative, or vice versa.

A Transform may be any derivative of price information. The above represent some examples of transforms that were implemented in the prototype, but many others may readily be implemented.

Flat Panel Display Elements

In addition to the World objects, several display elements are defined which render information regarding the objects. These display elements show the same information as the World, but in a flat, list-like format. The elements include the List, Alerts, and other "flat" informational displays.

The most important of these is the List. Within the List, the user can see bars of color which represent physical dimension of height in the World. The color of each bar matches the color of the Cylinder in the World. This method of display gives the user a different, sortable, method of viewing the same information as contained in the World.

Display Elements (e.g., the cylinders) are translucent, which allows the user to see "through" them to the World, thereby maximizing the use of screen space. Translucency is one of the properties of objects in the rendering engine. The programmer merely establishes Display Elements as flat objects in the foreground, with translucent color, and the Rendering Engine will handle the details of the display.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for transforming and displaying time-variable, market related data to a user, for assisting in making a decision relative to a user market position, the method comprising:
   a. receiving market-related data on a plurality of securities, the market-related data including historical and real-time data on the plurality of securities;
   b. transforming the received market-related data into a first and a second market-movement-related value for at least two of the plurality of securities;
   c. transforming by a computer the received market-related data into a market-movement-related value for a selected set of the plurality of securities, the set comprising at least two and at most all of the plurality of securities, into a set market-movement-related value;
   d. displaying a multi-dimensional representation of the first and the second value and the set value, the representation comprising:
      for each of the set securities, a geometric security shape having a first and a second visual characteristic for each of the respective first and the second values; and a reduced-profile object upon which the geometric security shapes for all of the set securities rest, the reduced-profile object having a characteristic indicative of the set value; and e. repeating steps (a)-(d) at a predetermined time interval, a change in the displayed representation over time for assisting the user in making a decision affecting the user market position.

2. The method recited in claim 1, wherein the reduced-profile object comprises a plate from which extend the geometric security shapes, a positioning of a geometric security shape above the plate indicative of a positive market movement value and a positioning of a geometric security shape below the plate indicative of a negative market movement value.

3. The method recited in claim 2, wherein the characteristic comprises at least one of a plate thickness, a plate color, a plate texture, and a plate brightness alteration.

4. The method recited in claim 1, wherein the representation further comprises, for at least one of the set securities, an indicium associated with the security shape indicative of a change in the first value.

5. The method recited in claim 4, wherein the indicium comprises a trailing image abutting the security shape.

6. The method recited in claim 1, wherein the first and the second characteristic are selected from a shape, a color, a dimension, a texture, and a configuration of a border associated with the security shape.

7. The method recited in claim 1, further comprising displaying a map comprising a plurality of reduced-profile objects and associated security shapes, a surface of the map indicative of a market-movement-related value of zero, the reduced-profile objects positioned on the map surface, and wherein the first value first characteristic comprises a height of the security shape, the height indicative of a relative, magnitude of the first value.

8. The method recited in claim 1, further comprising:
transforming the received market-related data into a market-movement related value for the plurality of reduced-profile objects and associated security shapes on the map; and
displaying a composite representation of the map value.

9. The method recited in claim 8, wherein the composite representation includes an indicium representative of at least one of a current trend and a change in trend of the map value.

10. The method recited in claim 1, wherein the market-related data comprise at least two of security price, relative volume, relative volume change, price breakout, price trend, change in trend, price velocity, price acceleration, and volatility.

11. The method recited in claim 1, wherein the securities in a set have a common feature.

12. A system for transforming and displaying time-variable, market related data to a user, for assisting in making a decision relative to a user market position, the system comprising:
a processor in signal communication with a network:
a display device in signal communication with the processor;
a software module installed on the processor, the software module comprising code segments adapted for:
a. receiving market-related data on a plurality of securities over the network, the market-related data including historical and real-time data on the plurality of securities;
b. transforming the received market-related data into a first and a second market-movement-related value for at least two of the plurality of securities;
c. transforming the received market-related data into a market-movement related value for a selected set of the plurality of securities, the set comprising at least two and at most all of the plurality of securities, into a set market-movement-related value;
d. directing the display to display a multi-dimensional representation of the first and the second value and the set value, the representation comprising:
for each of the set securities, a geometric security shape having a first and a second visual characteristic for each of the respective first and the second values; and
a reduced-profile object upon which the geometric security shapes for all of the set securities rest, the reduced-profile object having a characteristic indicative of the set value; and
e. repeating code segments (a)-(d) at a predetermined time interval, a change in the displayed representation over time for assisting the user in making a decision affecting the user market position.

13. The system recited in claim 12, wherein the reduced-profile object comprises a plate from which extend the geometric security shapes, a positioning of a geometric security shape above the plate indicative of a positive market movement value and a positioning of a geometric security shape below the plate indicative of a negative market movement value.

14. The system recited in claim 13, wherein the characteristic comprises at least one of a plate thickness, a plate color, a plate texture, and a plate brightness alteration.

15. The system recited in claim 12, wherein the representation further comprises, for at least one of the set securities, an indicium associated with the security shape indicative of a change in the first value.

16. The system recited in claim 15, wherein the indicium comprises a trailing image abutting the security shape.

17. The system recited in claim 12, wherein the first and the second characteristic are selected from a shape, a color, a dimension, a texture, and a configuration of a border associated with the security shape.

18. The system recited in claim 12, wherein the software module further comprises a code segment adapted for displaying a map comprising a plurality of reduced-profile objects and associated security shapes, a surface of the map indicative of a market-movement-related value of zero, the reduced-profile objects positioned on the map surface, and wherein the first value first characteristic comprises a height of the security shape, the height indicative of a relative magnitude of the first value.

19. The system recited in claim 12, wherein the software module further comprises code segments adapted for:
transforming the received market-related data into a market-movement-related value for the plurality of reduced-profile objects and associated security shapes on the map; and directing the display to display a composite representation of the map value.

20. The system recited in claim 19, wherein the composite representation includes an indicium representative of at least one of a current trend and a change in trend of the map value.

21. The system recited in claim 12, wherein the market-related data comprise at least two of security price, relative volume, relative volume change, price breakout, price trend, change in trend, price velocity, price acceleration, and volatility.

22. The system recited in claim 12, wherein the securities in a set have a common feature.

23. A method for permitting a user to establish a system for transforming and displaying time-variable, market-related data, for assisting in making a decision relative to a user market position, the method comprising:

a. accessing a software module resident on a processor in signal communication with a network;
b. requesting to receive over the network market-related data on a plurality of securities, the market-related data including historical and real-time data on the plurality of securities;
c. selecting a subset of the plurality of securities, the subset comprising at least two and at most all of the plurality of securities;
d. directing a software module resident on the processor to transform the received market-related data into a first and a second market-movement-related value for the selected subset at predetermined intervals;
e. directing the software module to transform the received market-related data into a market-movement-related value for the selected subset into a subset market, movement-related value at predetermined intervals;
f. selecting via the software module a desired display format for a multi-dimensional representation of the first and the second value and the subset value, the representation comprising:
  for each of the subset securities, a geometric security shape having a first and a second visual characteristic for each of the respective first and the second values; and
  a geometric base shape positioned in visual contact with the geometric security shapes for all of the subset securities, the base shape having a visual base characteristic indicative of the subset value; and
g. communicating with the software module to display the multidimensional representation in the selected format and to update the representation at predetermined intervals, a visually observable change in the displayed representation over time for assisting the user in making a market-related decision affecting the user market position.

* * * * *